United States Patent [19]
Edem et al.

[11] Patent Number: 5,440,556
[45] Date of Patent: Aug. 8, 1995

[54] LOW POWER ISOCHRONOUS NETWORKING MODE

[75] Inventors: Brian C. Edem, San Jose; Debra J. Worsley, Vista; Michael S. Evans, San Jose, all of Calif.

[73] Assignee: National Semiconductor Corporation, Sunnyvale, Calif.

[21] Appl. No.: 146,723

[22] Filed: Nov. 1, 1993

Related U.S. Application Data
[63] Continuation-in-part of Ser. No. 970,313, Nov. 2, 1992.

[51] Int. Cl.$^6$ .......................... H04B 1/38; H04J 3/06; H04L 7/00
[52] U.S. Cl. ..................... 370/79; 370/85.3; 370/94.3; 370/105.1; 370/108; 370/112; 340/825.02; 455/38.3; 455/343; 375/214; 375/219; 375/257; 375/354
[58] Field of Search ................. 370/26, 29, 58.1, 58.2, 370/58.3, 60, 85.4, 85.5, 85.7, 85.13, 91, 94.1, 94.2, 94.3, 97, 100.1, 102, 104.1, 105.1, 105.2, 108, 110.1, 112, 77, 79, 85.1, 85.2, 85.3; 375/3, 4, 7, 8, 36, 106, 110, 121; 340/825.44, 825.02, 825.06, 825.14, 825.2; 455/78.3, 53.1, 54.1, 54.2, 68, 69, 343

[56] References Cited
U.S. PATENT DOCUMENTS

| | | | |
|---|---|---|---|
| 3,619,505 | 11/1971 | Melle | 375/110 |
| 3,988,716 | 10/1976 | Fletcher et al. | 370/100.1 |
| 4,220,816 | 9/1980 | Howells et al. | 370/24 |
| 4,258,434 | 3/1981 | Glowinski et al. | 370/60 |
| 4,412,324 | 10/1983 | Glowinsky et al. | 370/58.1 |
| 4,419,765 | 12/1983 | Wycoff et al. | 455/38.3 |
| 4,449,248 | 5/1984 | Leslie et al. | 455/38.3 |
| 4,472,802 | 4/1984 | Pin et al. | 370/104.1 |
| 4,530,088 | 7/1985 | Hamstra et al. | 370/110.1 |
| 4,549,292 | 10/1985 | Isaman et al. | 370/85.5 |
| 4,577,315 | 3/1986 | Otsuka | 455/38.3 |
| 4,587,650 | 5/1986 | Bell | 370/85.5 |
| 4,637,014 | 1/1987 | Bell et al. | 370/85.7 |

(List continued on next page.)

OTHER PUBLICATIONS

Integrated PBX Systems, An NCC State of the Art Report, The National Computing Centre Limited, 1987.
ISDN Basic Rate Interface System Design Guide, Telenetworks document, Aug., 1989.
ISDN Primary Rate Interface System Design Guide, Telenetworks, document, Jul., 1989.
IEEE 802.3 Draft Supplement to IEEE Std 802.3 CSMA/CD Access Method and Physical Layer Specifications, Institute of Electrical and Electronics, Nov., 1989.
A communication system proposal presented to representative of Apple Computer on Mar. 5, 1990.
Irube et al., "Integrated Information and Communication System for Business Networks" *Hitachi Review* 40(3):241–247 (1991).
HMUX ERS "FDDI-II Hybrid Multiplexer (HMUX)" Rev. 2.4, (Mar. 25, 1991).
On or about Nov. 1, 1991, IBM Corporation provided a "Task Order" and appendix. A copy of pp. 6 and 7 of
(List continued on next page.)

*Primary Examiner*—Alpus Hsu
*Attorney, Agent, or Firm*—Limbach & Limbach

[57] ABSTRACT

A data communication system, such as a local area network, is provided with a capability of transmitting isochronous data. The system conveys both isochronous data and non-isochronous data by time-multiplexing the data into a recurring frame structure on a four-bit nibble basis. The arriving data is de-multiplexed at the hub into separate channels for handling the separate streams by appropriate hardware. When no calls are in progress, a low power mode enables two ends of a network link to reduce power consumption by transmitting a single pulse once every 125 microseconds in lieu of transmitting an entire cycle template. Synchronization while in low power mode allows circuitry at both ends of a network link to remain synchronized to a single reference clock.

23 Claims, 14 Drawing Sheets

U.S. PATENT DOCUMENTS

| | | |
|---|---|---|
| 4,771,426 | 9/1988 | Rattlingourd et al. ............. 370/102 |
| 4,800,560 | 1/1989 | Aoki et al. ........................ 370/104.1 |
| 4,811,367 | 3/1989 | Tajika .................................. 375/116 |
| 4,845,609 | 4/1989 | Lighthart et al. .................. 370/85.4 |
| 4,961,188 | 10/1990 | Lau ...................................... 370/442 |
| 4,964,121 | 10/1990 | Moore .............................. 370/100.1 |
| 4,993,026 | 2/1991 | Yamashita ........................ 370/100.1 |
| 5,001,707 | 3/1991 | Kositpaiboon et al. ........... 370/54.1 |
| 5,229,998 | 7/1993 | Weisser .............................. 370/108 |

OTHER PUBLICATIONS the Task Order and appendix titled, Isoethernet Project Local Cluster Controller Version 1.2.

"Exchangeable Card Architecture Specification," Release 1.00, bearing the date Dec. 20, 1991, pp. 7, 20 and 22.

"PCMCIA Socket Services Interface Specification," Draft 2.00b, bearing the date Jul. 17, 1992.

"VersaNet TM An Ethernet Extension for Isochronous Communications" bearing the date Aug. 14, 1992 is a paper sent to National Semiconductor Corporation from Condor Systems, Inc. of San Jose, Calif. on Aug. 18, 1992.

"IBM's Multimedia Venture: Opportunity for its Hardware?", vol. 38, No. 1930, p. 1, Sep. 21, 1992.

"DP839XX Isochronous Time Slot Exchanger (IsoTSX TM)", Revision 0.8, bearing the date Oct. 29, 1992 and DP839XX Isochronous Ethernet Physical Layer isoPhY TM Revision 1.1, bearing the date Oct., 1992, were disclosed to International Business Machines.

A disclosure of a communication system was presented at the IEEE 802.9 Standards Meeting on Nov. 8–12, 1992. The pages entitled "Multi-Media Applications are Ready".

"National Proposes Isochronous Ethernet", *Electronic News*, vol. 38, No. 1940, p. 19, Nov. 30, 1992.

IEEE 802.9 Draft Standard Integrated Services (IS) LAN Interface at the MAC and PHY Layers, Institute of Electrical and Electronics, Nov., 1992.

"DP839XX Isochronous Ethernet Physical Layer IsoPHY TM," Revision 2.1, beearing the date Dec., 1992 and DP839XX Isochronous Time Slot Exchanger (isoTSX), Revision 1.0, bearing the date Dec. 13, 1992, were disclosed to IBM and Ericsson.

"DP839XX Isochronous Ethernet Physical Layer isoPHY TM" Revision 3.0, bearing the date Dec., 1992 and Isochronous Time Slot Exchanger (IsoTSX TM) Workbook, Revision 1.2, bearing the date Feb. 16, 1993 was disclosed to Luxcom, Inc. of Fremont, Calif.

DP8390 Network Interface Controller: An Introductory Guide, Local Area Network Databook, National Semiconductor Corporation, pp. 1–206 to 1–213, 1992 Edition.

DP83932B Systems–Oriented Network Interface Controller, Local Area Network Databook, National Semiconductor Corporation, pp. 1–288 to 1–383, 1992 Edition.

DP83950A Repeater Interface Controller, Local Area Network Databook, National Semiconductor Corporation, pp. 3—3 to 3–7, 1992 Edition.

DP83950EB at IEEE 802.3, Multi–Port Repeater Evaluation Kit, Local Area Network Databook, National Semiconductor Corporation, pp. 75–87, 1992 Edition.

American National Standard for Information System—document X3.139–1987.

"Scheme for Fast Ethernet Proposed," by Loring Wirbel, appears to be a newspaper article. At present, the date of this article is unknown, but it is currently believed to be prior to Mar., 1993.

"Local Area Network Databook" published by National Semiconductor, pp. 1–3 to 1–9, 1–242 to 1–248, 5–3 to 5–7.

"Token–Ring Network Architecture Reference,", pp. 5–1 through 5–28 and pp. 5–10 and 5–17.

LOW POWER ISOCHRONOUS NETWORKING MODE

This application is a continuation-in part of U.S. patent application Ser. No. 07/970,313, filed Nov. 2, 1992 and incorporated herein by reference.

The present invention relates to a data communication network, such as a local area network or wide area network, and in particular to a network for transferring isochronous data.

BACKGROUND OF THE INVENTION

Isochronous data can generally be described as data which is non-packetized and of indeterminate, potentially continuous duration. Examples of isochronous data sources include video cameras, which output a substantially continuous stream of data representing images and associated sounds, and telephones, which output a substantially continuous stream of voice data. An example of an isochronous data sink is a video monitor which receives a substantially continuous stream of video data for display.

FIG. 1A schematically depicts isochronous data transfer. The data transfer is first initiated, such as by initiating a telephone conversation or beginning a video camera transmission 12. After initiating the data transfer, transmission of the data is provided substantially continuously for an indeterminate period, until termination of the telephone conversation or video transmission 14. Every bit transferred need not necessarily represent a data bit. "Housekeeping" bits to control destination and timing may be also transferred. Furthermore, the data being transferred may comprise "Null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4, dated Mar. 25, 1991.

The increasing availability of multi-media computers and work stations that include isochronous data sources and sinks in addition to non-isochronous sources and sinks has increased interest in the transfer of isochronous data in a network environment.

In a network environment, the receivers at both ends of the associated network link use a cycle template to enable the exchange of isochronous data. The cycle template continues to be exchanged even when the template contains no data and no isochronous communications are in progress. This continuous transmittal of data in the isochronous data path, requires the continual expenditure of network transmitter and receiver power. Power consumption directly influences the cost of operating the device and is of particular importance if the network component is battery driven. For example, if the network device is a lap top computer, the useful operating life of the device is a direct function of battery life.

SUMMARY OF THE INVENTION

Co-pending application Ser. No. 07/969,916, titled "Network for Data Communication with Isochronous Capability", now abandoned, describes a system that provides for communication of data to and from isochronous data sources and sinks. The system is implemented as a star-topology network with data sources transmitting to a central hub which, in turn, transmits the data to data sinks. Although for convenience, much of the following discussion is in terms of hubs and nodes, aspects of the present invention can be implemented in topologies other than hub-and-node topologies (e.g., ring topologies and tree topologies) as will be apparent to those of skill in the art. Descriptions of hub circuitry in the following can be implemented, e.g. on a PBX adapter card for a person computer. Several star-topology systems can be connected by inter-connection of the hubs, for example, in a ring structure. Multiplexed data arriving at the hub is de-multiplexed to separate the isochronous-source data, the non-isochronous-source data and D channel and M channel information. The non-isochronous-source data can be provided to hub circuitry specialized for handling the non-isochronous data stream. Preferably, circuitry in the hub converts the separated non-isochronous data stream into a form substantially similar to the form available over previous non-isochronous networks. For example, where non-isochronous data is sourced from an Ethernet MAC, the hub converts the separated non-isochronous data to a form handled by standard Ethernet hub repeater circuitry. According to one embodiment of the present invention, the hub-node system includes a means for entering a low power consumption mode during periods of no isochronous data transfer. The low power sequence is initiated from either end of the connection by the signaling of a low power request through, for example, maintenance bits. The receiving end filters these bits and checks that the request is received consistently in multiple consecutive frames before recognizing and acknowledging the request. After detecting the filtered acknowledge, the requesting device terminates cycle transmission at the end of the current cycle, where the cycle start indicator would have occurred if the cycle template had been running. Upon detecting the loss of cycle transmission, the receiving end terminates its cycle transmission and begins transmission of pulses every 125 us. The receivers at both ends of the link use the presence of the pulses to indicate that the node at the far end of the link is still connected. It can also use the pulse as an event to maintain synchronization to the 8 kHz network frame rate.

When either end of the link wishes to establish a call, the transmission of cycles resumes. This action is detected by the other end of the link, whereby that link also resumes transmission of cycles.

The hub-node system includes delay circuitry to compensate for cycle misalignments caused by system cabling. In the delay system of the present invention, the hub times the delay between the transmission of the pulse and the arrival of the received pulse. The hub thus senses the adjustment necessary and outputs a control signal to the node. At the node, a delay circuit stores the delay value and delays the start of the cycle reference provided to the node transmitter. The node transmitter thus outputs link pulses that arrive at the hub coincident with the beginning of a cycle thereby minimizing data skew.

According to another embodiment of the invention, the node delay circuitry comprises a latch controlled by the hub. The latch triggers when the pulse is provided to the node transmitter and thereby aligns the transmissions as desired.

Table I is a tabulation of a time division multiplexing scheme for multiplexing data streams according to an embodiment of the present invention; and Table II lists a form of four/five encoding according to an embodiment of the present invention.

DETAILED DESCRIPTION OF THE PREFERRED EMBODIMENT

The detailed description of this invention is given in the context of a data transfer system that supports both non-isochronous and isochronous communication. The description provided herein therefore enables a discussion of the invention in network systems employed for:

1) transfers between a non-isochronous source and non-isochronous sink connected to the same hub; and 2) transfers between an isochronous source and an isochronous sink connected to the same hub.

The description therefore illustrates several of the more common situations in which the invention might be used.

General Overview of System Operation

Figure 1B:
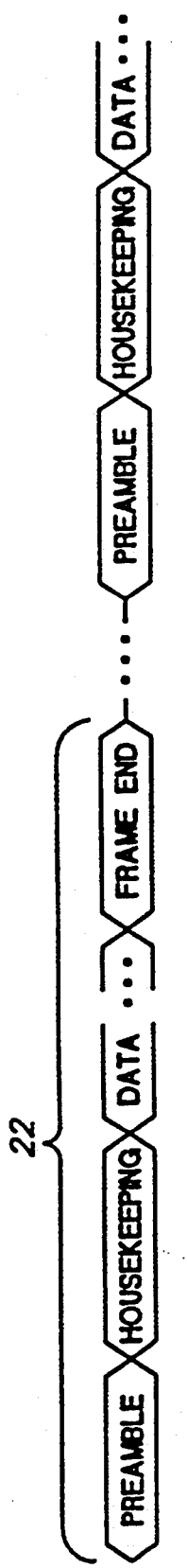
FIG. 1B is a timing chart for a packetized data transmission.
Figure 1C:
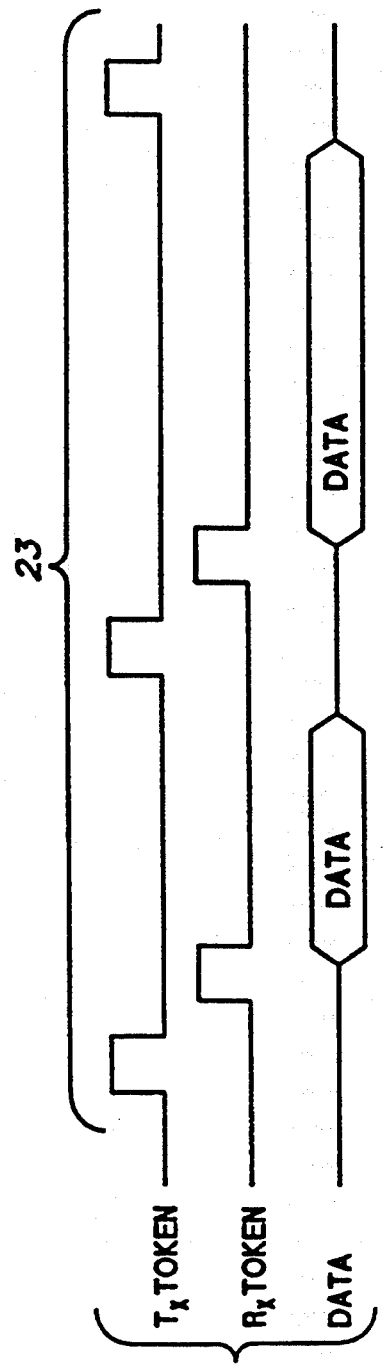
FIG. 1C is a timing chart for a token ring data transfer.
Figure 1A:
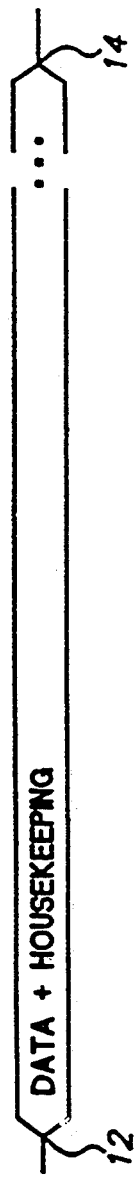
FIG. 1A is a timing chart of an isochronous data transmission.
Figure 2A:
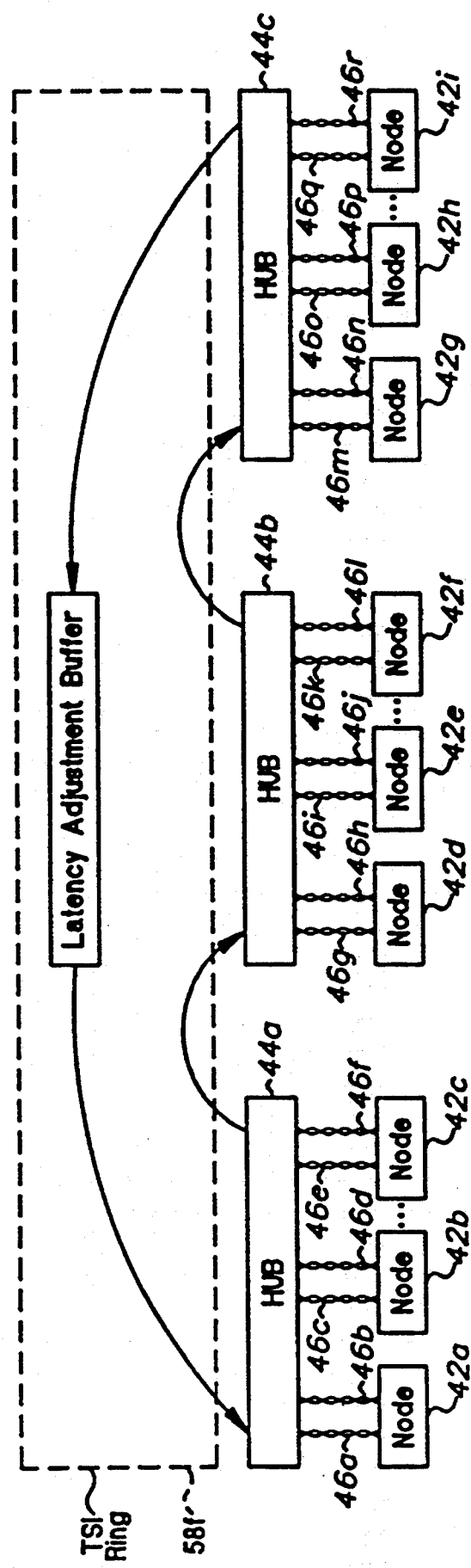
FIG. 2A is a diagram of a star and ring topology communication system according to an embodiment of the present invention.
Figure 2B:
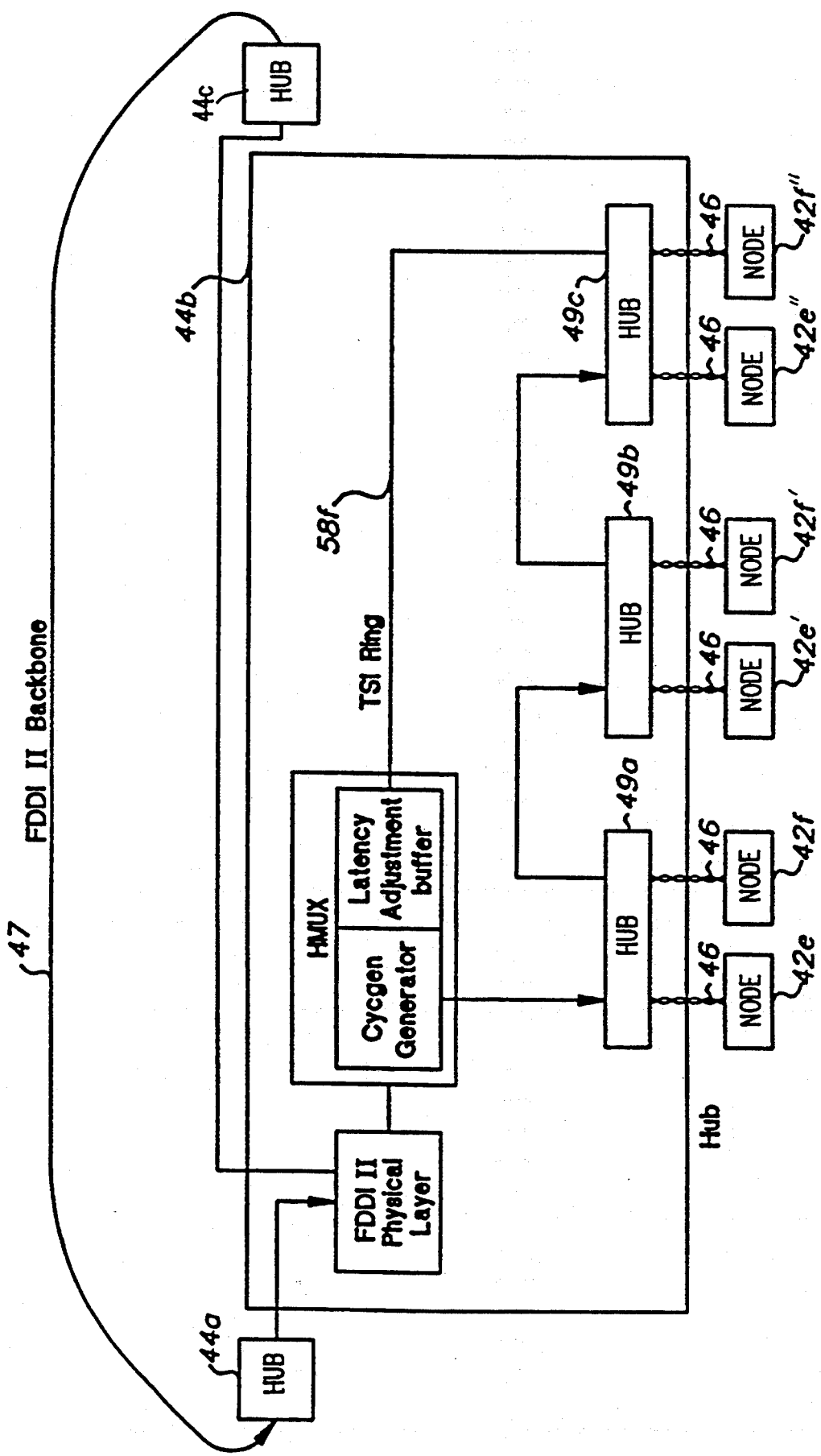
FIG. 2B is a diagram of a star and ring topology communication system having multiple isochronous circuitry within a single hub according to an embodiment of the present invention.
Figure 2C:
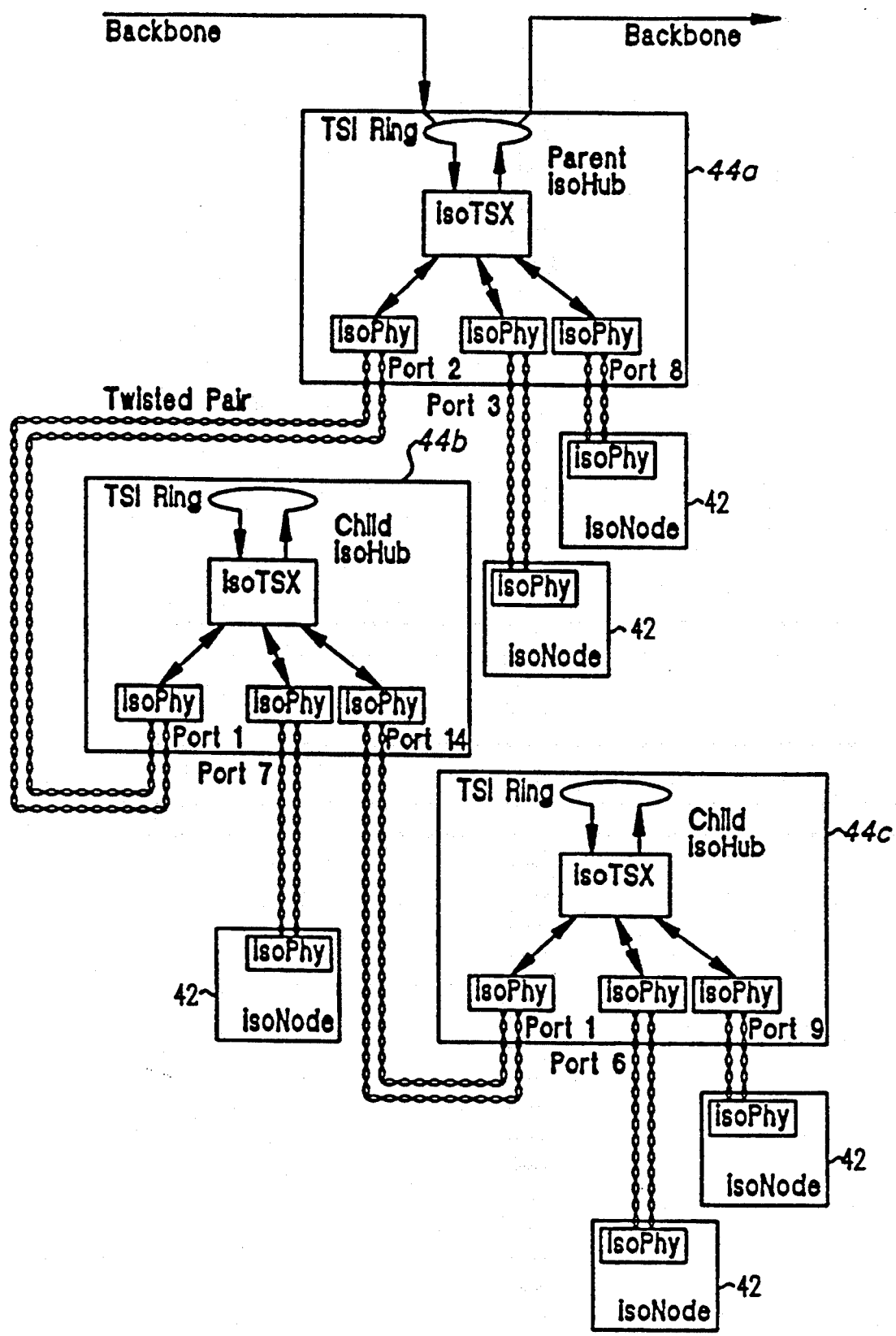
FIG. 2C is a diagram of a tree topology communication system according to an embodiment of the present invention.

Pending application Ser. No. 07/969,916, titled "Network for Data Communication with Isochronous Capability", now abandoned, describes a data communication system for isochronous data that can be configured in a star-topology and interconnected in a ring or tree topology. Such a system is shown in FIGS. 2A, 2B or 2C. In the configuration depicted in FIG. 2A, the hubs are connected in a ring-topology with first hub 44a sending data to the second hub 44b, the second hub 44b sending data to the third hub 44c, the third hub sending data back to the first hub 44a via a cycle generator and latency adjustment circuitry. The inter-hub connections are over a Time Slot Interchange (TSI) ring 58f. In one embodiment, an FDDI-II system can be used as the TSI ring 58f. FIG. 2B shows hubs 44a, 44b and 44c arranged in a star and ring topology having multiple isochronous circuitry within a single hub. FIG. 2C shows a tree topology communication system. The parent hub 44a connects to a high bandwidth backbone. Hub 44b operates as a child hub of parent hub 44a and is attached at port 2 of hub 44a. Child hub 44c cascades from child hub 44b.

The star and ring topology includes a plurality of nodes 42a, 42b, 42c attached to a single hub operating on the high bandwidth bus. The exact number of nodes varies depending on the data transmission needs and objectives of the system. Each of the nodes 42a–42c can include various types of sources and sinks such as strictly isochronous sources and sinks, strictly non-isochronous sources/sinks or both isochronous and non-isochronous sources and sinks. Data links comprising physical data transmission media, such as one-way twisted pair wires 46a–46r, couple each node to one of hubs 44a–44c.

Figure 3:
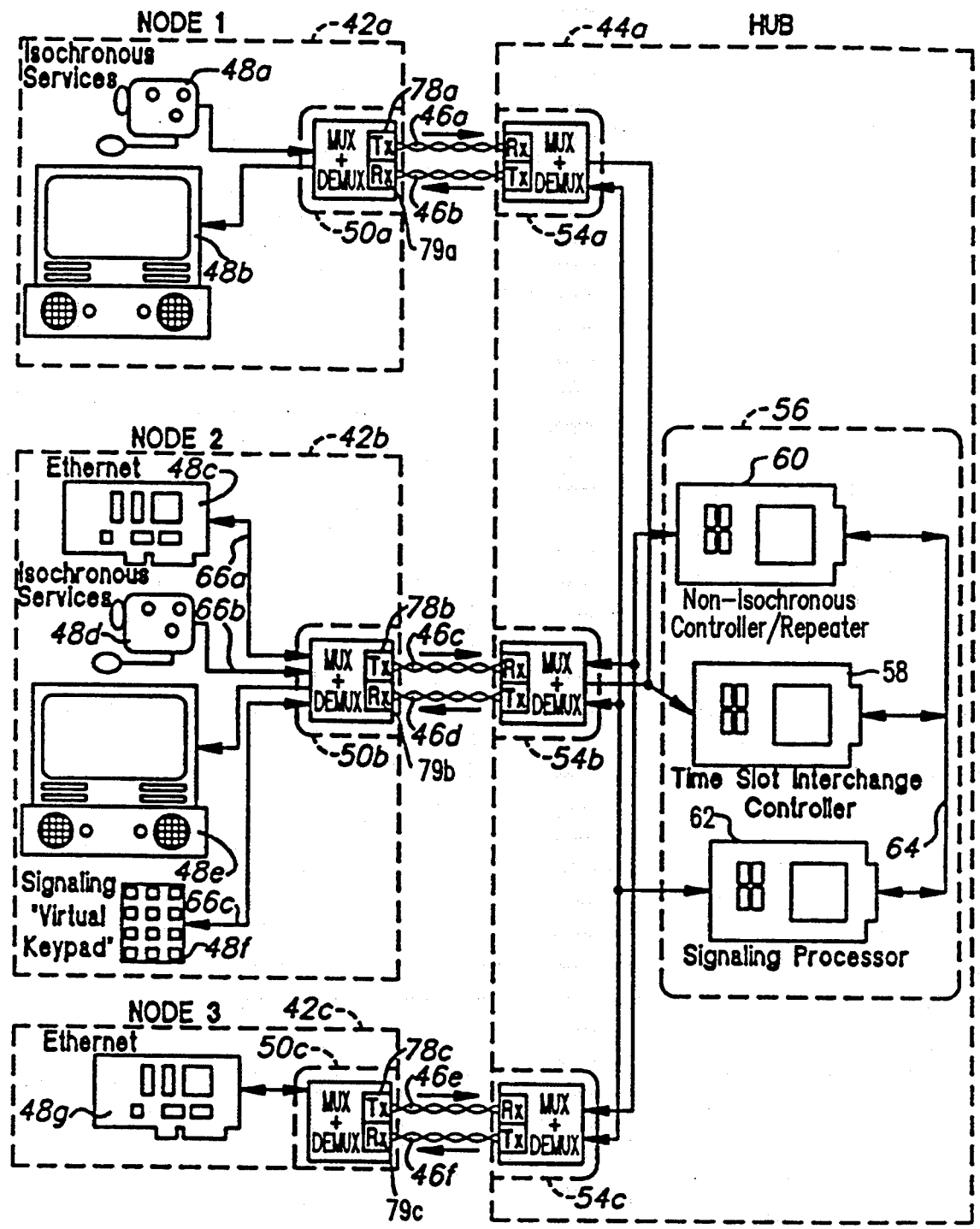
FIG. 3 is a communication system configured according to an embodiment of the present invention.

FIG. 3 shows hub 44a and associated nodes 42a–42c in greater detail. FIG. 3 may, by itself, form a complete star topology system. Each node 42a, 42b, 42c includes circuitry 50a, 50b, 50c. Circuitry 50a–c transmits data using transmitters 78a, 78b, 78c, for conversion to a form suitable for transmission onto the physical media 46a, 46c, 46e; and receives signals from the physical media 46b, 46d, 46f using receivers 79a, 79b, 79c for conversion to a form suitable for use by the data sinks.

Hub 44a includes circuitry 54a, 54b, 54c for receiving data from the physical media 46a, 46c, 46e; separating the isochronous-sourced data from the non-isochronous-sourced data and the D channel and maintenance channel data; and converting separated data into a form suitable for handling by downstream hub circuitry 56. In the depicted embodiment the separated isochronous-sourced data is provided to isochronous switching circuitry such as a time slot interchange controller 58 for placing the data on a TSI bus so that it can be transported to and retrieved by other equivalent circuitry 54a–54c in the hub for transmission to various destination nodes 42a–42c to other hubs. The separated non-isochronous data is provided to circuitry 60 configured to convey the non-isochronous data for transmission to destination nodes 42a, 42b, 42c. In an embodiment in which non-isochronous-sourced data includes Ethernet data, the hub circuitry 60 can be a standard Ethernet repeater processor. In this way, the system can be at least partially backwards-compatible with previous Ethernet hub systems.

The D channel and maintenance data is provided to a signaling processor 62. Signaling processor 62 performs various maintenance and control functions such as identifying and alerting users of error conditions, and setting up requested connections, i.e. source/destination paths e.g. by communicating with the isochronous and non-isochronous controllers 58, 60, e.g. over data path 64. The isochronous controller 58 can be a data exchanger e.g. on isochronous switching device such as that described in commonly assigned application Ser. No.

08/146,337, titled "Time Slot Exchanger Switching Mechanism In A Network For Data Communication Having Isochronous Capability", filed on even date herewith and incorporated herein by reference. The non-isochronous controller 60 can be, for example, an Ethernet repeater.

The operation of the components described above may be understood by describing the transfer of data from video camera, isochronous source, 48d to isochronous sink 48b and from Ethernet Mac, non-isochronous source 48c to non-isochronous sink 48g. Data sent from isochronous device 48d is a continuous stream of digitized data having, for example, a rate equal to the American "T1" standard of 1,544 Mb/sec. Once initiated, transfer of isochronous data, including null data is continuous until termination of the connection. Data output from the Ethernet MAC 48c is provided at the standard 10 Base T Ethernet rate of 10 Mb/sec. D channel information is provided from a D channel data stream source preferably contained in a MAC or other circuitry in the system, or for example, from the virtual key pad 48f at a variable data rate, such as a rate not exceeding about 64 Kb/sec.

Figure 4:
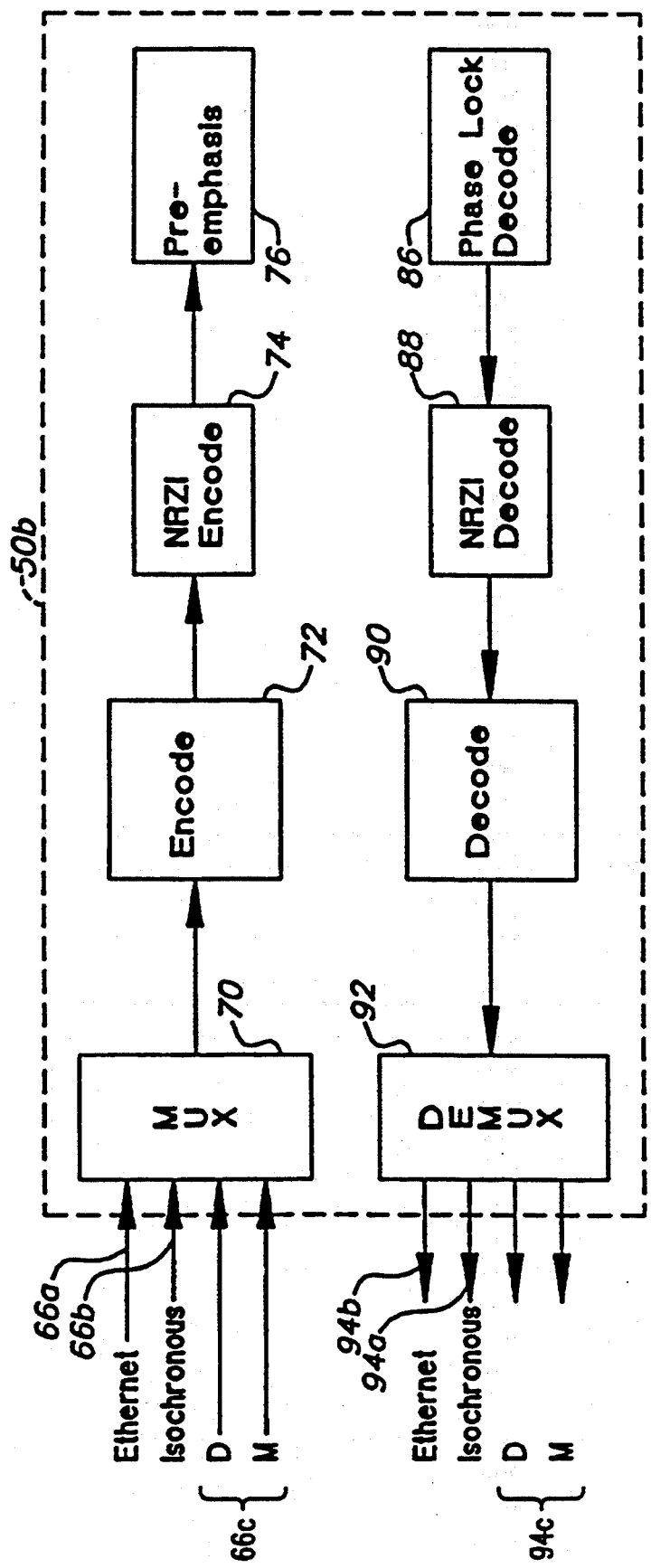
FIG. 4 is a block diagram of circuitry according to an embodiment of the present invention.

Lines 66a, 66b, 66c carry the data streams from sources 48d and 48c to node circuitry 50b. FIG. 4 shows circuitry 50b which is a portion of circuitry 50b shown in FIG. 2. Circuitry 50b comprises hardware that operates on the incoming data stream to enable efficient, compatible transmission between the data source and destination. A multiplexer 70 time-division multiplexes the incoming data on a four-bit basis using a repeating series of frames or templates. Preferably, the frames repeat with a period identical to the public telephone network, (i.e., 125 microseconds). A reference clock signal initiated at one physical location in the network and propagated throughout the network, is used for timing the frame transmissions. When the network connects to an external system, such as a public telephone network or other wide area network, the clock signal from the external system can be used to establish the reference clock for the network of the present invention. Thus, in one embodiment, a hub or node connects to a public telephone network and the frame sync from the public telephone network propagates through the network of the present invention.

Tables IA and IB tabulate a scheme for time division multiplexing the various data streams, additional data and control bytes. Each symbol in Table IA represents four bits of data and therefore every group of two symbols represents one 8-bit byte of data. In Table IA, E represents four bits of data from the non-isochronous Ethernet stream 66a, B designates four bits of data from the isochronous stream 66b and D represents four bits of data from the D channel stream 66c. M represents M channel data 66d, which preferably is provided by circuitry 50b. In addition, certain byte-length patterns are provided. JK represents a frame synchronization pattern and EM (the first two bytes of block three in Table IA) represents an Ethernet "pad" followed by a maintenance byte.

As seen in Table IA, each frame contains 256 bytes which can be considered in thirty-two groups of eight bytes each, or four blocks of sixty-four bytes each. For a data rate output from the isochronous source 48d of 1.544 Mb/sec. The frame structure described provides an isochronous bandwidth capability of 6.144 Mb/sec. Thus, the single isochronous source 48b in the present example can be entirely accommodated using only 48 of the 192 "B" symbols per frame. A basic rate ISDN Channel could be supported by using three 64 Kb/s slots within the isochronous channel. Thus, a variety of isochronous sources may be allocated among the available isochronous bandwidth. The frame structure is described more thoroughly in commonly-assigned application Ser. No. 07/969,911, titled "Network for Transmitting Isochronous-Source Data with a Frame Structure". Frame structures other than that described could be used to provide an allocation of bandwidth suited for the particular purpose. Table IB shows one of the many possible frame alternate formats. In general, Table IB is similar to Table IA, with replacement of all "E" symbols with "B" symbols. As seen in Table IB, the last byte in each block is an "Idle" data byte.

As shown in FIG. 4, the time-multiplexed data is then encoded by an encoder 72 to maintain the AC balance of the cable which can be potentially upset by an extended string of binary zeros. In the depicted embodiment, the encoder performs four/five encoding. One particular form of four/five encoding, conforming partially to the ANSI X3T9.5 standard, is described by Table II. These patterns, when properly combined, have a maximum of three bit times with no transition. The encoding scheme depicted in Table II is described in greater detail in U.S. Pat. No. 5,361,261.

The results of the four/five encoding is then further encoded by encoder 74 of FIG. 4 using a non-return to zero, inverted (NRZI) scheme. The four/five-NRZI encoding is particularly useful in networks in which a non-isochronous source is a 10 Base T Ethernet source because the encoding provides for transmission at a signaling rate substantially compatible with the data rates provided and expected by the Ethernet MAC. Other types of encoding or decoding, however, can also be used such as a scheme encoding 8 bits into 10 bits.

After encoding, the data is sent to pre-emphasis circuitry 76 and to a transmitter or driver 78b. Pre-emphasis circuitry 76 compensates the signal transmitted onto the physical medium to reduce jitter. The signal is then transmitted over the physical medium 46c to hub 44a which can include twisted pair, coaxial or fiber optic cable.

Figure 5:
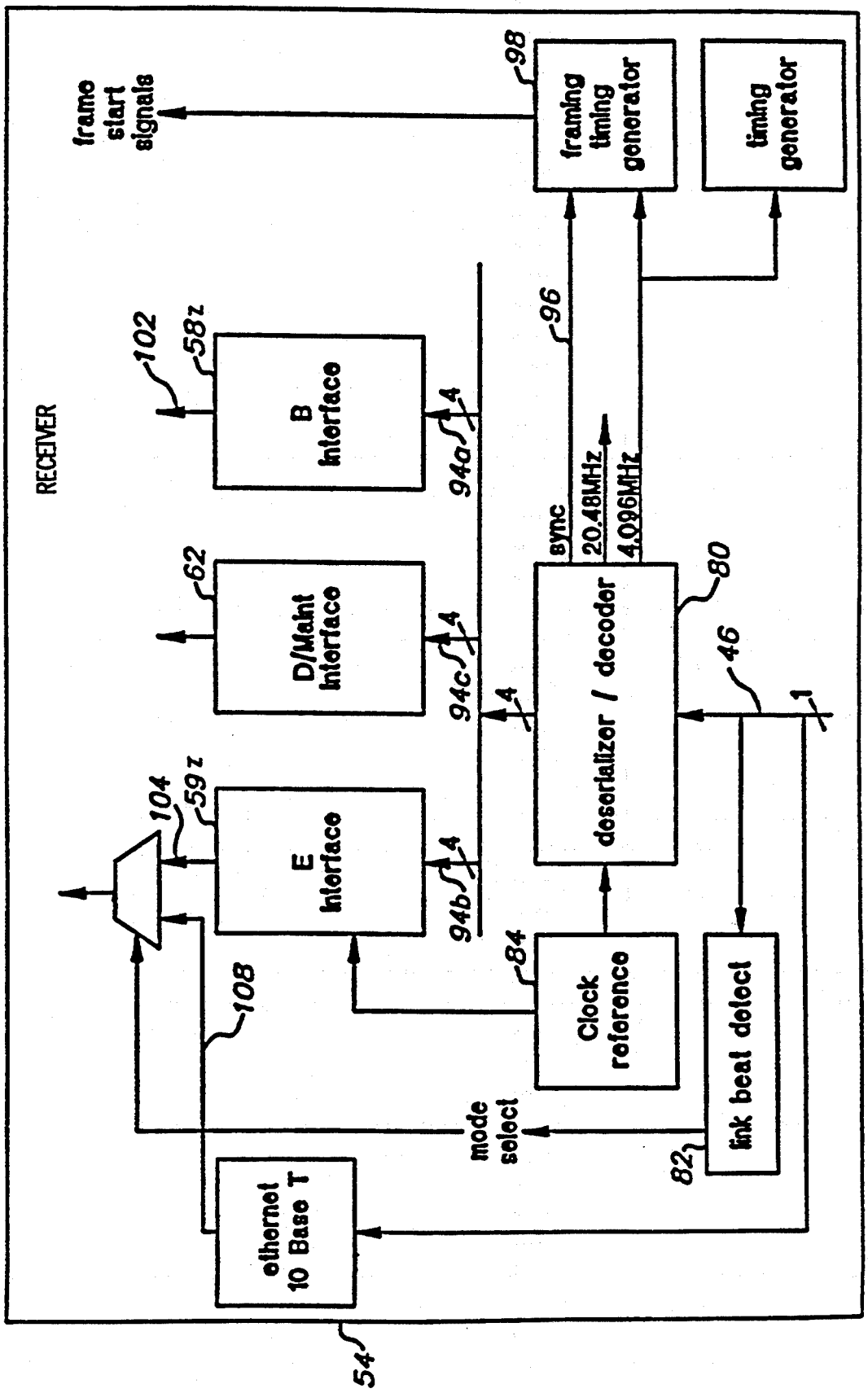
FIG. 5 is a block diagram of hub receiver circuitry according to an embodiment of the present invention.

Hub 44a as seen in FIG. 3 comprises a plurality of circuit devices 54a, 54b, 54c, each one coupled to one of nodes 42a, 42b, 42c by physical layer portion interface. As depicted in FIG. 5, the data transmitted over the physical layer portion interface arrives serially at a deserializer/decoder 80. De-serializer/decoder 80 includes circuitry which is functionally an inverse of the multiplexing/encoding circuitry described above and operates to decode the four/five NRZI encoding and to separate the isochronous and non-isochronous sourced data. De-serializer/decoder 80 also outputs a synchronization signal, derived from the JK frame synchronization symbols 96 for use by a framing timing generator 98.

Link detect circuitry 82 also receives the data from the physical layer portion interface for detection of the mode in which the node is operating (e.g. 10 Base T, isochronous Ethernet or isochronous) and outputting a mode select signal, as described more fully in commonly-assigned application Ser. No. 07/971,018, titled "Network Link Endpoint Capability Detection").

Both the non-isochronous-sourced data 104 and the isochronous-sourced data 102 are made available to the various hub circuitry components, as needed for transmission to the destination nodes. In one embodiment, the separated isochronous data 102 and non-isochronous data 104 are reconfigured by the respective interfaces 58, 60 to provide isochronous output 102 and non-isochronous output 104 in a form suitable for transmission to the destination nodes via the physical layer. In one embodiment, the non-isochronous data 94b is configured by the physical layer E interface 59z (FIG. 5) so that the output data 104 can be processed by a repeater device for eventual transmission to destination nodes. As an alternative to using a repeater for the non-isochronous data, packet connections may be linked through media access control layer bridges.

Figure 6:
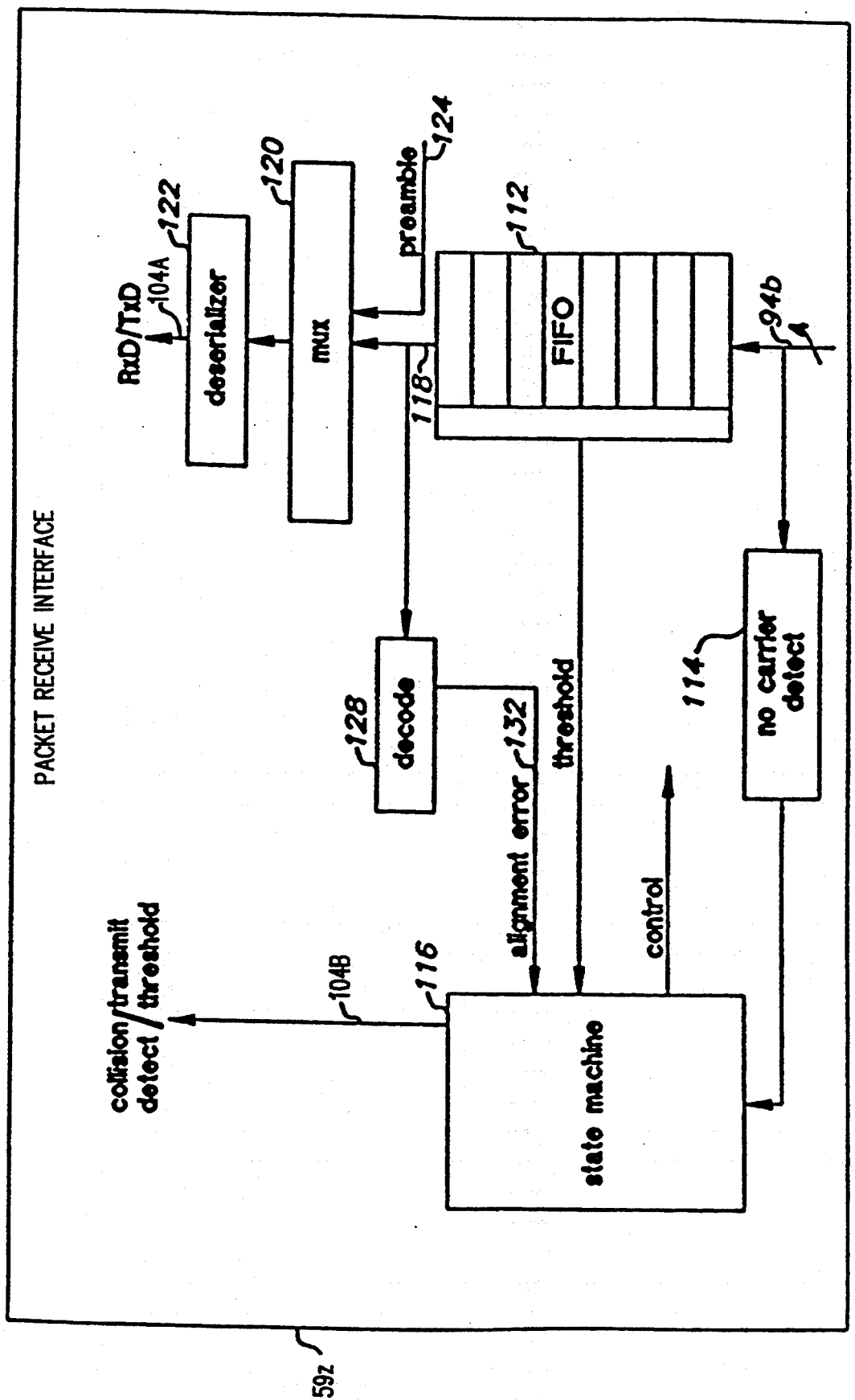
FIG. 6 is a block diagram of a receive interface for non-isochronous data according to an embodiment of the present invention.

FIG. 6 depicts one implementation of an E interface 59z of a type which will receive the non-isochronous data 94b and provide outputs 104a, 104b of a type that can be processed by previously-available repeater circuitry 60z. The non-isochronous data is received in a first-in-first-out (FIFO) buffer 112 to smooth out data rates. Circuitry 114 detects "no carrier" symbols, provided to emulate Ethernet data packets, used by logic circuitry or state machine 116 to output carrier detect signals. The output 118 from FIFO 112 is provided to a multiplexer 120 and a de-serializer 122 to produce data output 104a. Multiplexer 120 can receive a preamble stream 124 to provide the proper preamble bits in the output data 104a. Output 118 from FIFO 112 is also provided to decode circuitry 128 to recognize data collision and alignment error symbols and output appropriate signals 130, 132 to state machine 116. Operation and components of the receive interface 59 are described more thoroughly in U.S. Pat. No. 5,361,261.

Figure 7:
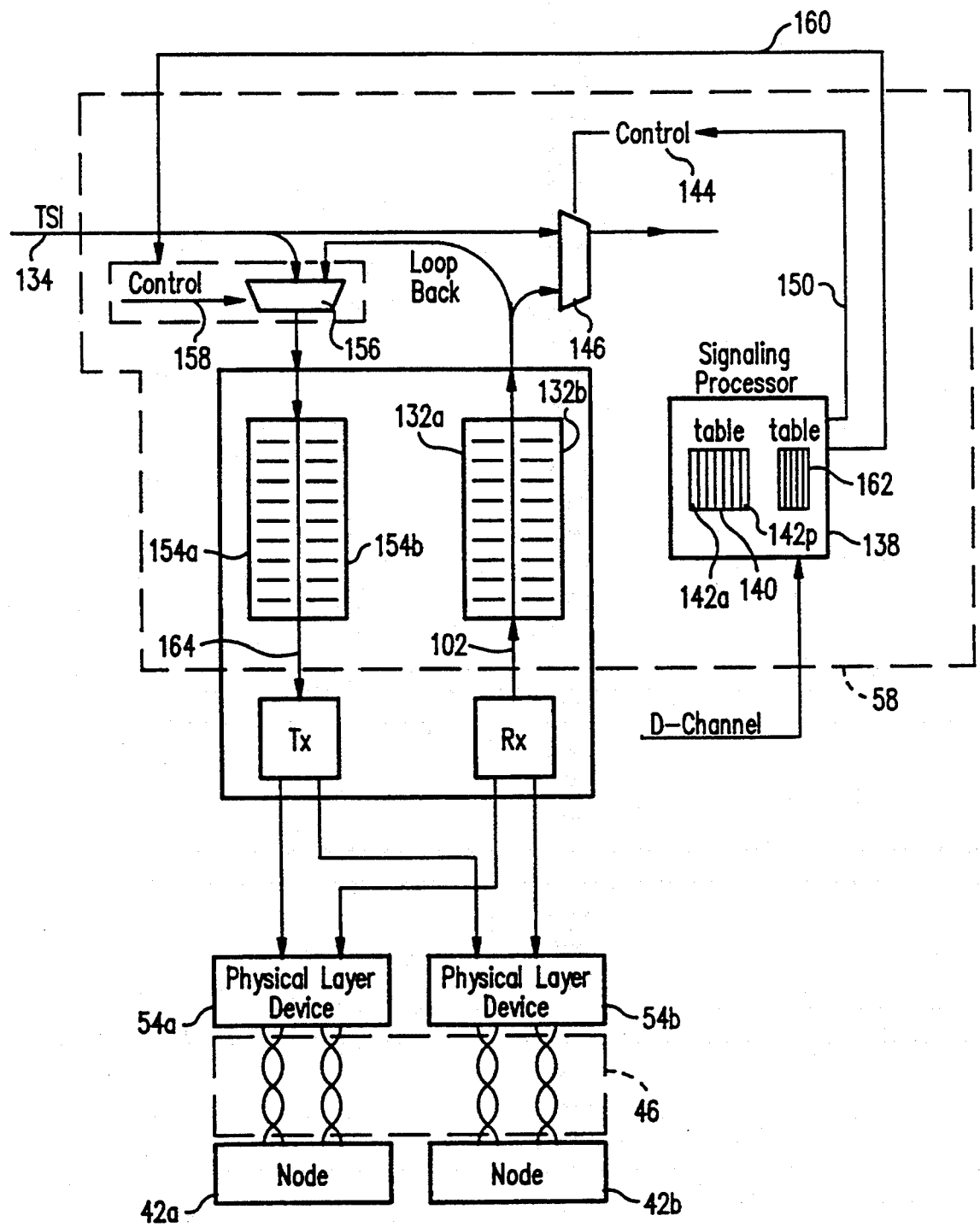
FIG. 7 is a diagram of a receive interface for isochronous data and associated hub circuitry according to an embodiment of the present invention.

For purposes of example, data from isochronous-source 48d (FIG. 7) is assumed transmitted in the first 24 Isochronous bytes of each frame represented by the "B" symbols in block 0 of Tables IA and IB, (i.e., the first forty-eight "B" symbols in the frame structure). In the embodiment of FIG. 7 the separated isochronous data 102 is stored in one of two buffers 132a, 132b. The timing of storage in the buffers 132a, 132b is coordinated with the 125 microsecond frame transmission timing so that data 102 from a first frame will be stored in the first buffer 132a during a first period of 125 microseconds and, during the next 125 microsecond period, the isochronous data 102 from the next frame will be stored in the second buffer 132b. In one embodiment, the data can be stored in the buffer 132 in the same order it is received, such that the eight bits represented by the first two "B" symbols in Table IA is stored in the first storage location of buffer 132a, that corresponding to the second two "B" symbols in Table IA is stored in the second location of buffer 132a and so on. Since the frame structure depicted in Table IA contains 96 bytes of isochronous data per frame, each of the buffers 132a, 132b has the capacity to store 96 bytes of data per node supported. After isochronous data from a first frame is stored in buffer 132, during the next 125 microsecond period (while the data from the next frame is being stored in the second buffer 132b) data which was stored in the first buffer 132a may be transmitted onto a high bandwidth bus 134. The loading and ordering of the buffer 132 is dependent upon the number of nodes supported by hub 44a. Bus 134 has sufficient bandwidth to carry the isochronous data output from a plurality of nodes which are connected to the hub 44a. In an embodiment in which the hub 44a is connected to 16 nodes, the bandwidth of the bus 134 must be sufficient to receive 1,536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments of the invention could be provided with other bandwidths in place of the TSI bus 134. However, the 98304 Kb/sec bandwidth is particularly useful because it substantially matches the bandwidth employed in FDDI-II, making it particularly easy to port the data on the TSI bus 134 to a TSI ring 58f (FIG. 2A) in configurations where the TSI ring 58f is an FDDI-II system.

According to one embodiment, the data is conveyed from the buffer 132 into a time slot on the bus 134 in a time slot interchange fashion. Data carried on TSI bus 134 is transmitted in 125 microsecond time frames divided into 1,536 time slots, each of which has a duration of about 0.08138 microseconds. Each time slot has data and associated control and parity. Thus a byte could represent 10 bits of time slot information. Thus, data from buffer 132a may be placed onto TSI bus 134, by transmitting a given one of the 1,536 bytes stored in 132a on TSI bus 134 at the proper one of the 1,536 time slots of the 125 microsecond frame. Which of the time slots is "proper" depends on the use which is to be made of the data and, in particular, the destination for the data as predetermined in the connection set-up via the D channel.

The destination for data, in the depicted embodiment, has been pre-established using the D channel information. The D channel information is sent to a signaling processor 138. The D channel information, which includes source, destination, and other needed information, is used to store values in preferably a switch table 140. In one example, switch table 140 may be divided into sixteen sections 142a–142p corresponding to the sixteen nodes associated with the hub circuitry 58 of this example. Each section 142 contains 1,536 bits, corresponding to the 1,536 time slots in a TSI bus time frame. These bits can be used as a control 144 for a multiplexer 146.

In the present example, the twenty-four bytes of data from 48d per 125 microsecond frame are conveyed in the first twenty-four B slots of each frame. Thus, the data from source 48d will be stored in the isochronous data buffer 132. The destination for the isochronous data of this example is monitor 48b. Thus, the 24 B slots of data will be transferred to data buffer 154a and then on the next frame transmitted to 48b in its corresponding first 24 B slots.

The 24 B slots could have been destined for the TSI bus in which case the 24 B slots in 132 would have been switched onto the TSI bus. A bit of the contents of the switch table would have controlled line 150 to control the multiplexer 146 at a rate of one bit for every TSI time slot (i.e., one bit every 0.080 microseconds). Assuming the first 10 time slots of the TSI bus do not receive the B data which is destined for a node attached to another hub, during the first TSI time slot, the multiplexer control 114 will be "0" and no data will be output from the buffer 132 onto bus 134. The multiplexer 146 will merely convey along the TSI bus 134 whatever data was already on the TSI bus in the first time slot. This continues until the 11th time slot of the TSI bus, at which time the B data destined for a node attached to another hub begins to be output onto the TSI bus. During each of the next 24 TSI bus time slots, the control signal for multiplexer 146 will be "1" and a byte of data stored in the appropriate data location of buffer 132 will be output through multiplexer 146 onto the bus 134. Which data location of the buffer 132 is "appropriate" can be determined by a read pointer contained in the switch table. Preferably, buffer 132 is a random access memory RAM and the read pointer will be determined according to the contents of the switch table, on representing the TSI slot time. After completion of conveying the 24 bytes onto the TSI bus, there will be no output from the buffer 132a during subsequent time slots of this TSI frame since in this example no other connections were established. In this way, time slots 11 through 34 for a frame on the TSI bus will be filled with data stored in the buffer 132a, i.e. the 24 bytes of data output by the isochronous source 48d.

FIG. 7 also depicts transmission of the isochronous data retrieved from TSI bus 134 to a destination node. The present example requires hub 44a to retrieve the twenty-four bytes of data stored in the first twenty-four even-numbered time slots of the transmitted frame. Data from the TSI ring is retrieved by the B interface 58z associated with sink 48b.

Retrieval from the TSI ring is achieved by a multiplexer 156 controlled by a control signal 158 output over line 160 from the signaling processor 138, relying on a Table 162 in a fashion similar to that described for control of multiplexer 146.

Figure 8:
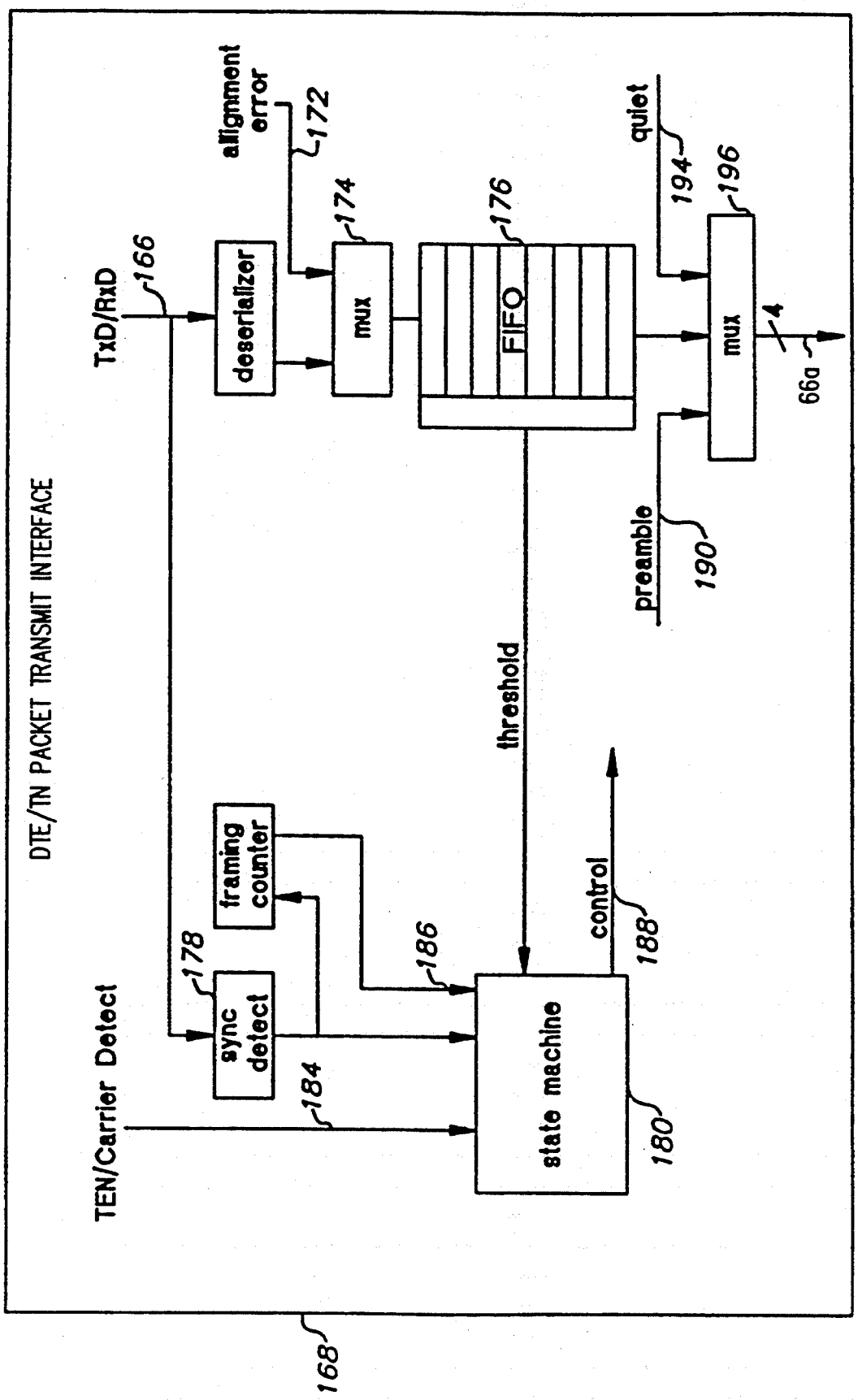
FIG. 8 is a block diagram of a hub transmit interface for non-isochronous data according to an embodiment of the present invention.

The E interface 168 (FIG. 8) of hub 44a retrieves the non isochronous data (source 48c) from repeater 60 intended for the non-isochronous sink 48g. An example of an E transmit interface 168 is depicted in FIG. 8. The transmit interface depicted in FIG. 8 is in general, the functional inverse of the E receive interface 59z depicted in FIG. 6. The data 166 is de-serialized and is then combined with any necessary alignment error bits 172 in a multiplexer 174, the output of which is conveyed to a FIFO 176. A parallel interface could also be provided, without the need for the FIFO when used directly with a MAC. A sync detect circuit 178 extracts synchronization information from the repeater output 166 for conveying to a state machine 180. State machine 180 also receives carrier detect information 184, framing counter information 186, and provides control signals 188 to FIFO 176. The data output from FIFO 176 is multiplexed with preamble bits 190, and "null carrier" bits 194 by a multiplexer 196. Operation of the E transmit interface is described more thoroughly in the U.S. Pat. No. 5,361,261.

Figure 9:
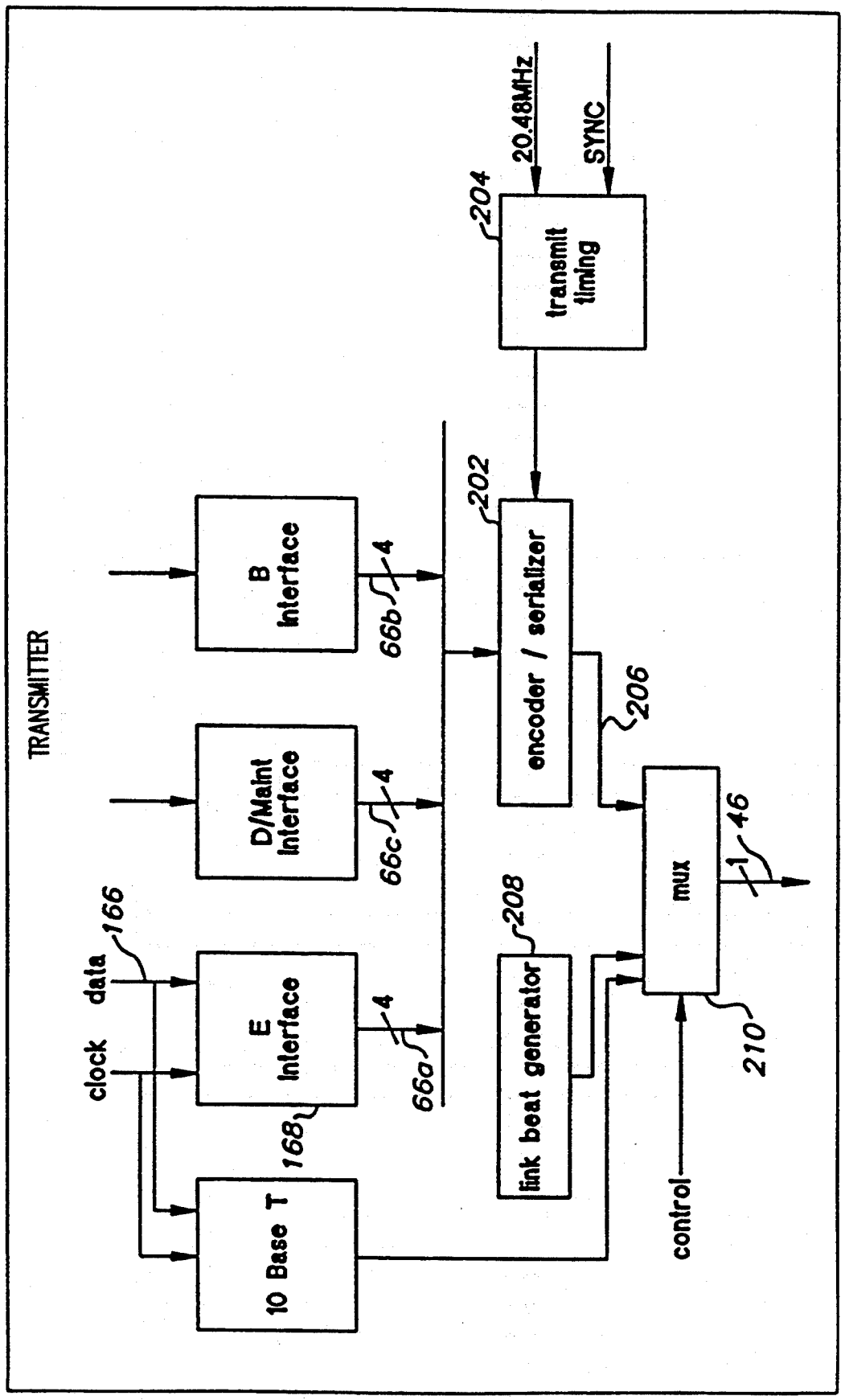
FIG. 9 is a block diagram of a hub transmitter interface for non-isochronous data according to an embodiment of the present invention.

The data 66a output from E transmit interface 168 is provided along with isochronous data output 66b and M channel and D channel data 66c to encoder serializer circuitry 202, as depicted in FIG. 9. Encoder/serializer 202 is configured substantially like the encoding circuitry depicted in FIG. 4. Specifically, encoder/serializer 202 provides a multiplexer for combining the three streams of data 66a, 66b, 66c, a four/five encoder, an NRZI encoder, and pre-emphasis circuitry. The timing of transmission is controlled by transmit timing circuitry 204. Output 206 from the encoder/serializer is selectively combined with link beats from a link beat generator 208 by multiplexer 210 for purposes of link end point detection, as described more thoroughly in application Ser. No. 07/971,018.

Both isochronous and non-isochronous data sent from hub 44a to the nodes 42 is sent in a frame format which is preferably substantially the same as the frame format used for the data sent from the nodes 48 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a de-multiplexer 92. Decoded and demultiplexed data is then delivered to the various data sinks in the nodes 42.

Low Power Mode

According to the present invention, when no calls are in progress, two connected network components can cease transmitting the cycle template to conserve power. In lieu of transferring the cycle template complete with null data, a link pulse is exchanged between the two components. The link pulse is transmitted at that point in time in which the cycle start delimiter would normally be transmitted.

Figure 10:
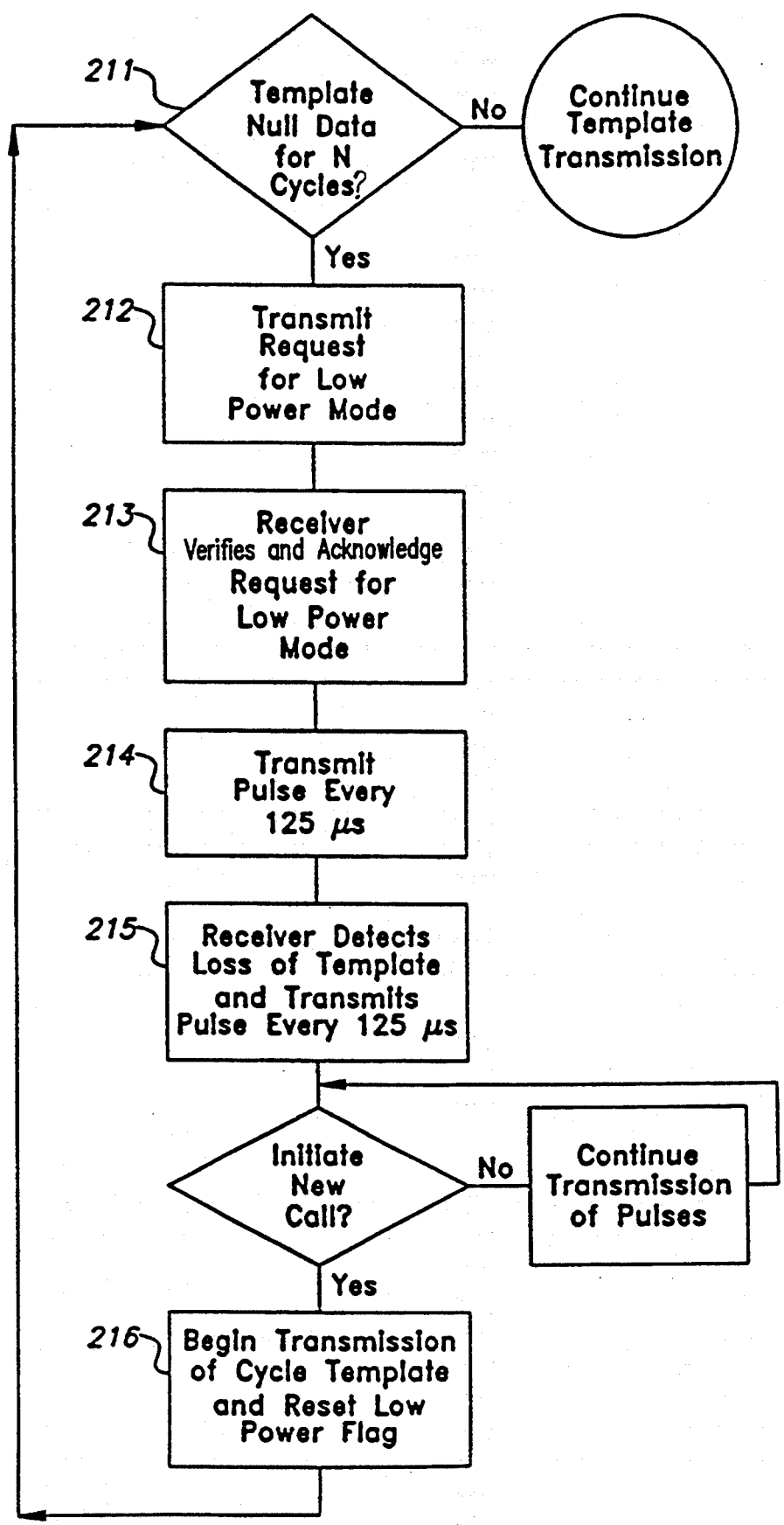
FIG. 10 is a flow chart of low power mode operations according to an embodiment of the present invention.

FIG. 10 is a flow chart of how two network components enter low power mode according to an embodiment of the present invention. In step 211, the first network component detects that no calls are in progress and that the isochronous link data template carries null data. The detection step 211 may be implemented by counting a set number of null data templates and setting an appropriate flag in the maintenance bit registers. Optionally, the detection step may be accomplished by examining the D channel source, and destination data to see if a call is in progress. If no call is indicated by the D channel data, the appropriate flag is set in the maintenance bit registers.

In step 212, the network component initiating the low power mode transmits in the M channel stream of data a bit pattern requesting low power mode. The network component on either end of the link can initiate the low power mode. The network component receiving the low power request bit pattern in the M channel data stream checks to see if the low power request is received consistently in multiple frames. The number of frames of consistent transmission required to verify the low power request may be any number and may be preestablished by the user.

In step 213, the device receiving the low power request has received and verified the request bit pattern and transmits an acknowledgement signal to indicate that the link should now enter the low power mode.

In step 214, the network component initiating the low power mode detects the acknowledgement, and the link enters low power mode. During the low power mode, the requesting circuitry transmits a single 0.1 microsecond pulse every 125 microseconds at the point in time where the cycle start indicated would normally be transmitted during transmission of a cycle template. In step 215, the receiving end detects loss of transmission of the cycle template and also begins transmitting a single 0.1 microsecond pulse every 125 microseconds. The receivers at both end of the link use the presence of the pulses to indicate that a connection between the devices exist. The transmitters of both devices, however, are now turned on only to transmit the single link pulse. The transmitters need not continually remain on to broadcast the cycle template.

Exiting the low power mode occurs in step 216. In this step, the network device wishing to initiate the call, begins retransmitting the cycle template. The receiving end of the cycle template detects the transmission, and exits the low power state by beginning cycle transmission. One or more cycles of idle data are exchanged between devices before transmission of data begins. The number of cycles of idle data is also user variable.

The link pulse may also be used to maintain synchronization between hub and node. Thus, when the node exists the low power state cycle transmission from the node will occur in phase with the system reference clock.

Figure 11:
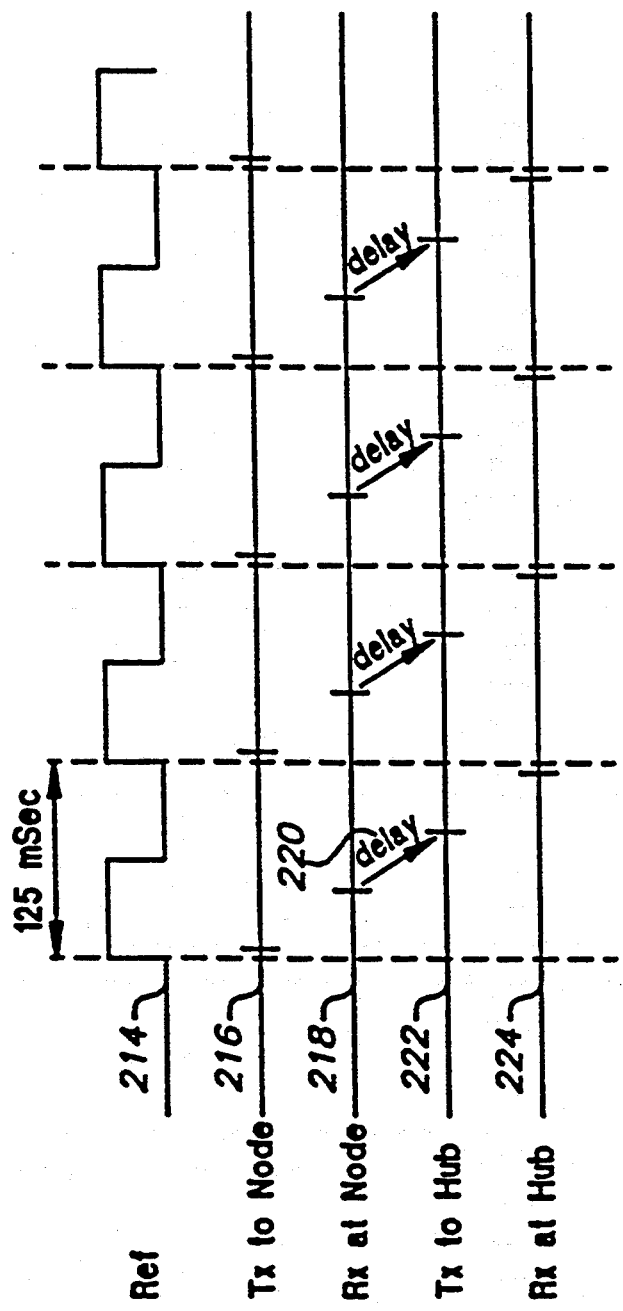
FIG. 11 is a timing chart for coordinating data transfers according to an embodiment of the present invention.

FIG. 11 depicts a timing scheme to reduce delay and jitter to enable the buffering operation described in the paragraphs above. As shown in FIG. 11, the timing can be synchronized with a 125 microsecond reference clock signal 214 that provides an ascending clock edge every 125 microseconds. The reference signal can be provided by any of a number of sources, including by synchronization to an external clock reference, such as a reference signal from a wide area network or from a FDDI-II ring or a telephone source, such as a T1 (1.54 Mb/s) link provided by a local telephone company. At the beginning of a cycle, hub 44 begins to transmit a frame to the node, as indicated by the timing marks on time line 216. Because of the line delays in the physical media, the time at which the nodes receive the frame transmitted by the hub lags the time when the frame was sent from the hub as shown by time line 218. A delay 220 is therefore introduced before the node begins transmission of the next frame to hub 222. Delay 220 accounts for the latency introduced by transmission over physical media 46 and encoding delays introduced by the hub and node, such that the hub begins receiving the transmitted frame at times 224 approximately coinciding with the rising edges of the clock signals 214.

The hub makes a measurement of the amount of adjustment to be made to the nodes cycle delay. This can be done by timing the delay between the transmission of the cycle start and the arrival of the received cycle start. This adjustment can then be sent to the node as a bit serial stream. The arrival value would be added to the current value, with the modified value to be used as the cycle delay.

Another scheme for adjusting delay transmits a signal to the node which indicates that the cycle delay is to be increased. Every cycle that this increase parameter is received, the node increases the cycle delay. The advantage is in the use of a counter to hold the cycle delay value but requires multiple cycles to correct the skew.

Figure 12:
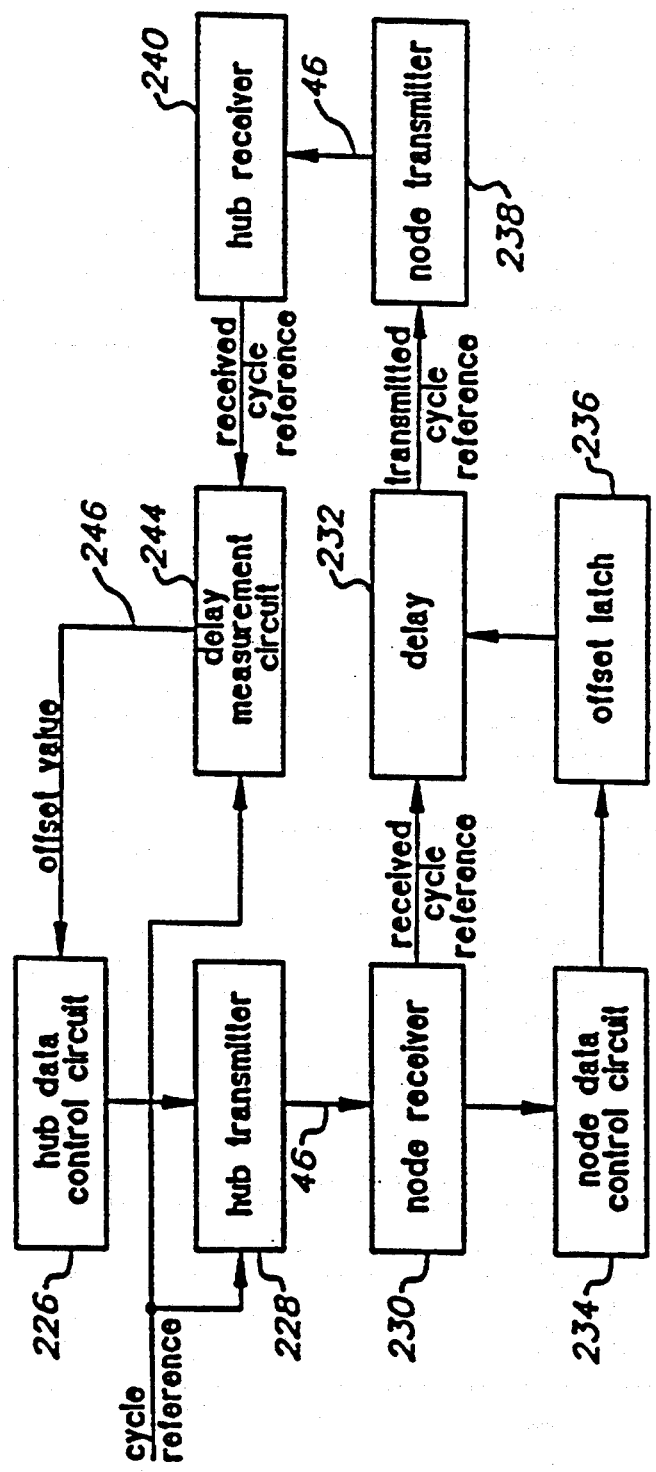
FIG. 12 is a block diagram of node circuitry having a delay circuit according to an embodiment of the present invention.

FIG. 12 is a block diagram of delay circuitry useful for aligning the transmitted and received data to compensate for line delays. The delay circuitry of FIG. 12 comprises a data control circuit 226. Control circuit 226 may comprise a finite state machine and adder and/or register circuitry. Circuit 226 may store a known, fixed initial value of delay for each of the nodes coupled to the hub 44. Latch 236 could also be initialized to a known fixed delay. For cable lengths under 100M, this and the small FIFO proves suitable. An adjustable delay accommodates longer lengths, such as with fiber optics. The adjustable delay value is output as a stream of control bits, together with the cycle reference frame, by hub transmitter 228 over physical media 46 to node receiver 230. The cycle reference frame can be supplied by any of a number of possible sources as described above.

At node receiver 230, the cycle reference is extracted and provided to node delay circuit 232. The delay control bits are provided to node data control circuit 234. Node data control circuit 234 may also comprise a state machine, and registers, and/or counter circuits.

The output of node control circuit 234 controls circuit 236. According to one embodiment of the present invention circuit 236 is a memory or counter device that stores the current delay value and outputs this value to delay circuit 232. Delay circuit 232 then waits a period of time, t, as given by the output of circuit 236 before transmitting the cycle reference frame to the node transmitter circuit 238. Data from node transmitter 238 is transmitted in phase with the cycle reference frame.

Data transmitted by node transmitter 238 is received by hub receiver 240 over physical media 46. Hub receiver 240 extracts the transmitted cycle reference and outputs this data to delay measurement circuit 244. Delay measurement circuit 244 compares the cycle reference received from the node to the external cycle reference to obtain an offset value 246.

Offset value 246 indicates the delay required to align the received and transmitted data. When the offset value is zero, the received and transmitted frames are in phase. The offset value may be used to increment the initial delay value stored in circuit 226, or be added to the current delay value stored in circuit 226 to obtain a new current delay value for output to the node.

The delay circuitry of the present invention accommodates all lengths of cable up to a cycle reference length of delay. Other delays can also be accommodated so long as the sum of delays is an integral number of frame cycles. Because the data is multiplexed, the delay circuit of the present invention also has the advantage of accommodating the delays of the many individual isochronous sources coupled to the node.

The timing scheme described above guarantees that the cycle received from the node arrives slightly sooner than the next cycle transmitted from the hub. A small FIFO can be inserted into the hub's received data stream to accurately align the arrival of the cycle. A similar FIFO structure may be used in the node to synchronize data with the received cycle reference until it is to be transmitted.

Although the present invention has been described by way of preferred embodiments and certain variations and modifications, other variations and modifications can also be used, the invention being defined by the following claims.

TABLE IA

| BLOCK 0: | | | | | | | | | | | | | | | |
|---|---|---|---|---|---|---|---|---|---|---|---|---|---|---|---|
| J | K | E | B | E | B | E | B | E | B | E | B | E | B | E | E | Group 0 |
| E | E | E | B | E | B | E | B | E | B | E | B | E | B | E | E | Group 1 |
| E | E | E | B | E | B | E | B | E | B | E | B | E | B | E | E | Group 2 |
| E | E | E | B | E | B | E | B | E | B | E | B | E | B | E | E | Group 3 |
| E | E | E | B | E | B | E | B | E | B | E | B | E | B | E | E | Group 4 |
| E | E | E | B | E | B | E | B | E | B | E | B | E | B | E | E | Group 5 |
| E | E | E | B | E | B | E | B | E | B | E | B | E | B | E | E | Group 6 |
| E | E | E | B | E | B | E | B | E | B | E | B | E | B | E | E | Group 7 |
| BLOCK 1: | | | | | | | | | | | | | | | |
| M | M | E | B | E | B | E | B | E | B | E | B | E | B | E | E | Group 8 |
| E | E | E | B | E | B | E | B | E | B | E | B | E | B | E | E | Group 9 |

TABLE IA-continued

| | | | | | | | | | | | | | | | | |
|---|---|---|---|---|---|---|---|---|---|---|---|---|---|---|---|---|
| E | E | E | B | E | B | E | B | E | B | E | B | E | B | E | E | Group 10 |
| E | E | E | B | E | B | E | B | E | B | E | B | E | B | E | E | Group 11 |
| E | E | E | B | E | B | E | B | E | B | E | B | E | B | E | E | Group 12 |
| E | E | E | B | E | B | E | B | E | B | E | B | E | B | E | E | Group 13 |
| E | E | E | B | E | B | E | B | E | B | E | B | E | B | E | E | Group 14 |
| E | E | E | B | E | B | E | B | E | B | E | B | E | B | E | E | Group 15 |
| BLOCK 2: | | | | | | | | | | | | | | | | |
| D | D | E | B | E | B | E | B | E | B | E | B | E | B | E | E | Group 16 |
| E | E | E | B | E | B | E | B | E | B | E | B | E | B | E | E | Group 17 |
| E | E | E | B | E | B | E | B | E | B | E | B | E | B | E | E | Group 18 |
| E | E | E | B | E | B | E | B | E | B | E | B | E | B | E | E | Group 19 |
| E | E | E | B | E | B | E | B | E | B | E | B | E | B | E | E | Group 20 |
| E | E | E | B | E | B | E | B | E | B | E | B | E | B | E | E | Group 21 |
| E | E | E | B | E | B | E | B | E | B | E | B | E | B | E | E | Group 22 |
| E | E | E | B | E | B | E | B | E | B | E | B | E | B | E | E | Group 23 |
| BLOCK 3: | | | | | | | | | | | | | | | | |
| E | M | E | B | E | B | E | B | E | B | E | B | E | B | E | E | Group 24 |
| E | E | E | B | E | B | E | B | E | B | E | B | E | B | E | E | Group 25 |
| E | E | E | B | E | B | E | B | E | B | E | B | E | B | E | E | Group 26 |
| E | E | E | B | E | B | E | B | E | B | E | B | E | B | E | E | Group 27 |
| E | E | E | B | E | B | E | B | E | B | E | B | E | B | E | E | Group 28 |
| E | E | E | B | E | B | E | B | E | B | E | B | E | B | E | E | Group 29 |
| E | E | E | B | E | B | E | B | E | B | E | B | E | B | E | E | Group 30 |
| E | E | E | B | E | B | E | B | E | B | E | B | E | B | E | E | Group 31 |

JK = Frame Synchronization Pattern
EM = Ethernet Pad & 4 Maintenance Bits
MM = 8 Maintenance Bits
E = Ethernet Packet Channel
D = D Channel
B = Isochronous Channel

TABLE IB

| | | | | | | | | | | | | | | | | |
|---|---|---|---|---|---|---|---|---|---|---|---|---|---|---|---|---|
| BLOCK 0: | | | | | | | | | | | | | | | | |
| J | K | B | B | B | B | B | B | B | B | B | B | B | B | B | B | Group 0 |
| B | B | B | B | B | B | B | B | B | B | B | B | B | B | B | B | Group 1 |
| B | B | B | B | B | B | B | B | B | B | B | B | B | B | B | B | Group 2 |
| B | B | B | B | B | B | B | B | B | B | B | B | B | B | B | B | Group 3 |
| B | B | B | B | B | B | B | B | B | B | B | B | B | B | B | B | Group 4 |
| B | B | B | B | B | B | B | B | B | B | B | B | B | B | B | B | Group 5 |
| B | B | B | B | B | B | B | B | B | B | B | B | B | B | B | B | Group 6 |
| B | B | B | B | B | B | B | B | B | B | B | B | B | B | I | I | Group 7 |
| BLOCK 1: | | | | | | | | | | | | | | | | |
| M | M | B | B | B | B | B | B | B | B | B | B | B | B | B | B | Group 8 |
| B | B | B | B | B | B | B | B | B | B | B | B | B | B | B | B | Group 9 |
| B | B | B | B | B | B | B | B | B | B | B | B | B | B | B | B | Group 10 |
| B | B | B | B | B | B | B | B | B | B | B | B | B | B | B | B | Group 11 |
| B | B | B | B | B | B | B | B | B | B | B | B | B | B | B | B | Group 12 |
| B | B | B | B | B | B | B | B | B | B | B | B | B | B | B | B | Group 13 |
| B | B | B | B | B | B | B | B | B | B | B | B | B | B | B | B | Group 14 |
| B | B | B | B | B | B | B | B | B | B | B | B | B | B | I | I | Group 15 |
| BLOCK 2: | | | | | | | | | | | | | | | | |
| D | D | B | B | B | B | B | B | B | B | B | B | B | B | B | B | Group 16 |
| B | B | B | B | B | B | B | B | B | B | B | B | B | B | B | B | Group 17 |
| B | B | B | B | B | B | B | B | B | B | B | B | B | B | B | B | Group 18 |
| B | B | B | B | B | B | B | B | B | B | B | B | B | B | B | B | Group 19 |
| B | B | B | B | B | B | B | B | B | B | B | B | B | B | B | B | Group 20 |
| B | B | B | B | B | B | B | B | B | B | B | B | B | B | B | B | Group 21 |
| B | B | B | B | B | B | B | B | B | B | B | B | B | B | B | B | Group 22 |
| B | B | B | B | B | B | B | B | B | B | B | B | B | B | I | I | Group 23 |
| BLOCK 3: | | | | | | | | | | | | | | | | |
| I | M | B | B | B | B | B | B | B | B | B | B | B | B | B | B | Group 24 |
| B | B | B | B | B | B | B | B | B | B | B | B | B | B | B | B | Group 25 |
| B | B | B | B | B | B | B | B | B | B | B | B | B | B | B | B | Group 26 |
| B | B | B | B | B | B | B | B | B | B | B | B | B | B | B | B | Group 27 |
| B | B | B | B | B | B | B | B | B | B | B | B | B | B | B | B | Group 28 |
| B | B | B | B | B | B | B | B | B | B | B | B | B | B | B | B | Group 29 |
| B | B | B | B | B | B | B | B | B | B | B | B | B | B | B | B | Group 30 |
| B | B | B | B | B | B | B | B | B | B | B | B | B | B | I | I | Group 31 |

JK = Frame Synchronization Pattern
M = 4 Maintenance Channel Bits
I = Idle Data
D = D Channel
B = Isochronous Channel

TABLE III

| Symbol | Encoded (5 bit) | Description |
|---|---|---|
| 0 | 11110 | Data 0 |
| 1 | 01001 | |
| 2 | 10100 | Data 2 |
| 3 | 10101 | Data 3 |

TABLE III-continued

| Symbol | Encoded (5 bit) | Description |
|---|---|---|
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |
| V | 00110 | Invalid |
| V | 01000 | Invalid |
| V | 10000 | Invalid |

What is claimed is:

1. A method for conserving power consumption in an isochronous data network having first and second transceivers which communicate over a network medium comprising the steps of:
repetitively transmitting cycle frame templates from said first transceiver to said second transceiver over said network medium;
repetitively transmitting cycle frame templates from said second transceiver to said first transceiver over said network medium;
detecting, by said first transceiver, a repeated transmission of null data in a plurality of cycle frame templates received from said second transceiver over said network medium;
transmitting from said first transceiver to said second transceiver over said network medium a request to enter a low power operating mode;
transmitting from said second transceiver to said first transceiver over said network medium an acknowledgement of said request; and
repetitively transmitting from said first transceiver to said second transceiver over said network medium a first transceiver pulse of a given duration in lieu of transmitting said cycle frame templates for conserving power in said first transceiver.

2. The method of claim 1 further comprising the steps of:
transmitting from said second transceiver to said first transceiver over said network medium a second transceiver pulse of a given duration in lieu of transmitting said cycle frame templates for conserving power in said second transceiver.

3. The apparatus of claim 1 wherein the transmission of said first transceiver pulse is synchronized to an external cycle reference.

4. The method of claim 3 further comprising the steps of:
transmitting said first transceiver pulse and a cycle delay signal from said first transceiver to said second transceiver;
forwarding said first transceiver pulse from a receiver of said second transceiver to a delay circuit of said second transceiver; and
delaying transfer of said first transceiver pulse from said delay circuit to a transmitter portion of said second transceiver by a given amount according to a value of said cycle delay signal; and
transmitting said delayed first transceiver pulse from said second transceiver as said second transceiver pulse.

5. Apparatus for communicating data among a plurality of data sources and sinks, at least a first of said sources and sinks configured to receive or transmit data isochronously and a second of said sources and sinks configured to transmit data non-isochronously, the apparatus comprising:
at least first and second nodes, said first node being coupled to both said first and second of said sources and sinks;
a hub transmitter for transmitting a cycle reference at least to said first node;
at least first and second data links, said first link coupling said first node with said hub, and said second link coupling said second node with said hub;
a multiplexer in said first node for transmitting data from both of said first and second sources and sinks over said first link, said multiplexer providing a first, dedicated bandwidth for data originating from an isochronous source;
wherein said first node includes:
means for transmitting a first node low power request signal to said second node;
means for transmitting a first node link pulse signal to said second node when said first node is in a low power mode;
wherein said second node includes:
means for transmitting a second node low power request signal to said first node; and
means for transmitting a second node link pulse signal to said first node when said second node is in a low power mode.

6. The apparatus of claim 5, wherein said first node link pulse and said second node link pulse are transmitted in a time period synchronized with said cycle reference.

7. The apparatus according to claim 5, wherein each said first node link pulse and said second node link pulse is approximately 0.1 microseconds in duration and is transmitted once every 125 microseconds.

8. The apparatus according to claim 5, wherein said hub further comprises:
means for transmitting said first node link pulse from said first node to said second node; and
means for transmitting said second node link pulse from said second node to said first node.

9. The apparatus according to claim 8, wherein said hub further comprises:
means for transmitting said first node low power mode request signal from said first node to said second node; and
means for transmitting said second node low power mode request signal from said second node to said first node.

10. The apparatus according to claim 5 wherein said first node includes means for transmitting a first node acknowledge signal to said second node in response to said second node low power request signal, and wherein said second node includes means for transmitting said second node link pulse in response to said first node acknowledge signal.

11. The apparatus according to claim 10 wherein said first node includes means for transmitting said first node link pulse in response to said second node link pulse.

12. The apparatus according to claim 5 wherein said second node includes means for transmitting a second node acknowledge signal to said first node in response to said first node low power request signal, and wherein said first node includes means for transmitting said first node link pulse in response to said second node acknowledge signal.

13. The apparatus according to claim 12 wherein said second node includes means for transmitting said second node link pulse in response to said first node link pulse.

14. The apparatus according to claim 5 wherein only one first link pulse and only one second link pulse is transmitted for each cycle reference.

15. An apparatus for conserving power consumption in an isochronous data network having first and second transceivers which communicate over a network medium comprising:
- means for repetitively transmitting cycle frame templates from said first transceiver to said second transceiver over said network medium;
- means for repetitively transmitting cycle frame templates from said second transceiver to said first transceiver over said network medium;
- means, associated with said first transceiver, for detecting a repeated transmission of null data in a plurality of cycle frame templates received from said second transceiver over said network medium;
- means for transmitting from said first transceiver to said second transceiver over said network medium a request to enter a low power operating mode;
- means for transmitting from said second transceiver to said first transceiver over said network medium an acknowledgement of said request; and
- means for repetitively transmitting from said first transceiver to said second transceiver over said network medium a first transceiver pulse of a given duration in lieu of transmitting said cycle frame templates for conserving power in said first transceiver.

16. The apparatus of claim 15 further comprising means for transmitting from said second transceiver to said first transceiver over said network medium a second transceiver pulse of a given duration in lieu of transmitting said cycle frame templates for conserving power in said second transceiver.

17. The apparatus of claim 15 wherein the transmission of said pulse is synchronized to an external cycle reference.

18. The apparatus of claim 17 further comprising:
- means for transmitting said first transceiver pulse and a cycle delay signal from said first transceiver to said second transceiver;
- means for forwarding said first transceiver pulse from a receiver of said second transceiver to a delay circuit of said second transceiver; and
- means for delaying transfer of said first transceiver pulse from said delay circuit to a transmitter portion of said second transceiver by a given amount according to a value of said cycle delay signal; and
- means for transmitting said delayed first transceiver pulse from said second transceiver as said second transceiver pulse.

19. A method for communicating data among a plurality of data sources and sinks, at least a first of said sources and sinks configured to receive or transmit data isochronously and a second of said sources and sinks configured to transmit data non-isochronously, wherein a hub is coupled to a first node through a first data link, wherein the hub is coupled to a second node through a second data link, and wherein the first node is coupled to both said first and second of said sources and sinks, the method comprising the steps of:
- transmitting a cycle reference from said hub at least to said first node;
- multiplexing data from both of said first and second sources and sinks over said first link;
- said multiplexing including providing a first, dedicated bandwidth for data originating from an isochronous source;
- transmitting a low power request signal to one of said first node or said second node to the other of said first node or said second node; and
- transmitting a link pulse signal from said one of said first node or said second node to said other of said first node or said second node when said one of said first node or said second node is in a low power mode.

20. The method of claim 19, wherein said link pulse is transmitted in a time period synchronized with said cycle reference.

21. The method according to claim 19, wherein said link pulse is approximately 0.1 microseconds in duration and is transmitted once every 125 microseconds.

22. The method according to claim 19, further comprising the step of:
- transmitting said link pulse from said one of said first node or said second node to said other of said first node or said second node through said hub.

23. The method according to claim 22, further comprising the step of:
- transmitting said low power mode request signal from said one of said first node or said second node to said other of said first node or said second node through said hub.

* * * * *